(12) United States Patent
Budreau et al.

(10) Patent No.: US 8,291,318 B2
(45) Date of Patent: Oct. 16, 2012

(54) VISUALIZING A MIXTURE OF AUTOMATED AND MANUAL STEPS IN A PROCEDURE

(75) Inventors: David A. Budreau, Innisfil (CA); Ian D. Chan, Toronto (CA); Osama S. Hashimi, Toronto (CA); Wing H. Lee, Richmond Hill (CA); Robert T. Uthe, Morrisville, NC (US)

(73) Assignee: International Business Machines Corporation, Armonk, NY (US)

( * ) Notice: Subject to any disclaimer, the term of this patent is extended or adjusted under 35 U.S.C. 154(b) by 806 days.

(21) Appl. No.: 11/966,589

(22) Filed: Dec. 28, 2007

(65) Prior Publication Data

US 2009/0172534 A1    Jul. 2, 2009

(51) Int. Cl.
*G06F 3/048* (2006.01)

(52) U.S. Cl. ........................................ 715/704; 715/709

(58) Field of Classification Search .................. 715/704, 715/709
See application file for complete search history.

(56) References Cited

U.S. PATENT DOCUMENTS

| | | | |
|---|---|---|---|
| 7,200,804 B1 * | 4/2007 | Khavari et al. | 715/230 |
| 7,376,896 B2 * | 5/2008 | Ullmann et al. | 715/704 |
| 7,506,256 B2 * | 3/2009 | Baker et al. | 715/708 |
| 7,620,895 B2 * | 11/2009 | Adkins et al. | 715/709 |
| 2005/0033713 A1 * | 2/2005 | Bala et al. | 706/59 |
| 2005/0240875 A1 * | 10/2005 | Takayama et al. | 715/745 |
| 2006/0053372 A1 * | 3/2006 | Adkins et al. | 715/709 |
| 2008/0082629 A1 * | 4/2008 | Puthiyaveettil | 709/217 |
| 2008/0098304 A1 * | 4/2008 | Coutts et al. | 715/704 |
| 2008/0178083 A1 * | 7/2008 | Bergman et al. | 715/704 |
| 2008/0184141 A1 * | 7/2008 | Selig | 715/762 |
| 2008/0209328 A1 * | 8/2008 | Parkinson | 715/733 |
| 2008/0282160 A1 * | 11/2008 | Tonnison et al. | 715/704 |
| 2009/0100369 A1 * | 4/2009 | Mindrum | 715/776 |

* cited by examiner

*Primary Examiner* — Mark Rinehart
*Assistant Examiner* — Meseker Takele
(74) *Attorney, Agent, or Firm* — Jordan IP Law, LLC

(57) ABSTRACT

Visualizing a mixture of automated and manual steps in a procedure. An application engages a teaching mode in a web-based graphical user interface (GUI), wherein a collection of selectable portions of the web-based GUI is accentuated. The application records a sequence of selections made among the collection of selectable portions of the web-based GUI as well as data entered within the GUI, where the sequence of selections represent a repeatable user-defined procedure for interacting with the web-based GUI. The application replays the sequence of selections within the web-based GUI while displaying a status of the replaying of said sequence of selections that enables a user to differentiate between manual steps that require user intervention and automatic steps that do not require user intervention.

19 Claims, 10 Drawing Sheets

FIG. 8

VISUALIZING A MIXTURE OF AUTOMATED AND MANUAL STEPS IN A PROCEDURE

BACKGROUND OF THE INVENTION

The present disclosure relates to the field of computers, and specifically to software. Still more specifically, the present disclosure relates efficient generation of computer instructions.

BRIEF SUMMARY OF THE INVENTION

A method for visualizing a mixture of automated and manual steps in a procedure. An application engages a teaching mode in a web-based graphical user interface (GUI), wherein a collection of selectable portions of the web-based GUI is accentuated. The application records a sequence of selections made among the collection of selectable portions of the web-based GUI as well as data entered within the GUI, where the sequence of selections represent a repeatable user-defined procedure for interacting with the web-based GUI. The application replays the sequence of selections within the web-based GUI while displaying a status of the replaying of said sequence of selections that enables a user to differentiate between manual steps that require user intervention and automatic steps that do not require user intervention.

BRIEF DESCRIPTION OF THE SEVERAL VIEWS OF THE DRAWINGS

FIGS. 7-9 are pictorial depictions of a graphical user interface of a provisioning manager enabling data reuse according to an embodiment of the present invention.

DETAILED DESCRIPTION OF THE INVENTION

Figure 1:
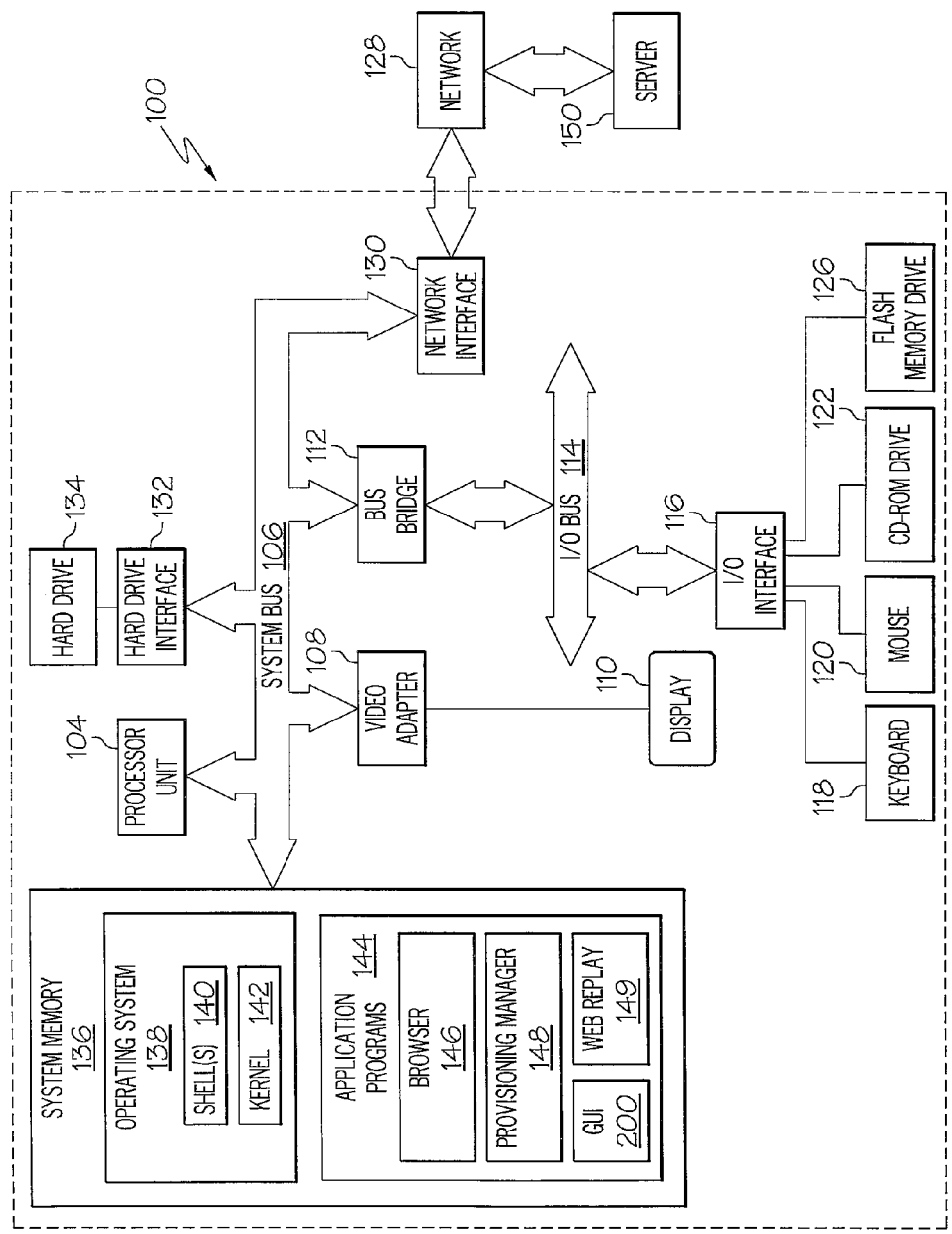
FIG. 1 depicts an exemplary network in which the present invention may be implemented.

As will be appreciated by one skilled in the art, the present invention may be embodied as a method, system, or computer program product. Accordingly, the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, the present invention may take the form of a computer program product on a computer-usable storage medium having computer-usable program code embodied in the medium.

Any suitable computer usable or computer readable medium may be utilized. The computer-usable or computer-readable medium may be, for example but not limited to, an electronic, magnetic, optical, electromagnetic, infrared, or semiconductor system, apparatus, device, or propagation medium. More specific examples (a non-exhaustive list) of the computer-readable medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a transmission media such as those supporting the Internet or an intranet, or a magnetic storage device. Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory. In the context of this document, a computer-usable or computer-readable medium may be any medium that can contain, store, communicate, propagate, or transport the program for use by or in connection with the instruction execution system, apparatus, or device. The computer-usable medium may include a propagated data signal with the computer-usable program code embodied therewith, either in baseband or as part of a carrier wave. The computer usable program code may be transmitted using any appropriate medium, including but not limited to the Internet, wireline, optical fiber cable, RF, etc.

Computer program code for carrying out operations of the present invention may be written in an object oriented programming language such as Java® (Java is a trademark or registered trademark of Sun Microsystems, Inc. in the United States and other countries), Smalltalk, C++ or the like. However, the computer program code for carrying out operations of the present invention may also be written in conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through a local area network (LAN) or a wide area network (WAN), or the connection may be made to an external computer (for example, through the Internet using an Internet Service Provider).

The present invention is described below with reference to flowchart illustrations and/or block diagrams of methods, apparatuses (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the flowchart and/or block diagram block or blocks.

In a computer system and/or network, a "run book" is a set of procedures for routine and special operation of the computer system and/or network by a system administrator or network operator. For example, a run book may include procedures for starting, stopping, and monitoring of the computer system and/or network; for handling special requests; and for handling problems that may occur during the operation of the computer system and/or network. Essentially, a run book enables automation of an organization's computer system and/or network procedures in managing the information technology (IT) department.

According to an embodiment of the present invention, a system administrator can utilize a web service to enable computer system and/or network automation. The system administrator utilizes "web replay" to define desired procedures with a product and perform the desired procedures automatically upon invocation of a particular procedure. The administrator can then give other users access to specific procedures, and may import and export them to share across multiple systems. Also, in an embodiment of the present invention, the administrator can give other users the ability to edit existing or imported predefined procedures.

With reference now to FIG. 1, there is depicted a block diagram of an exemplary computer 100, with which the present invention may be utilized. Computer 100 includes a processor unit 104 that is coupled to a system bus 106. A video adapter 108, which drives/supports a display 110, is also coupled to system bus 106. System bus 106 is coupled via a bus bridge 112 to an Input/Output (I/O) bus 114. An I/O interface 116 is coupled to I/O bus 114. I/O interface 116 affords communication with various I/O devices, including a keyboard 118, a mouse 120, a Compact Disk-Read Only Memory (CD-ROM) drive 122, and a flash memory drive 126. The format of the ports connected to I/O interface 116 may be any known to those skilled in the art of computer architecture, including but not limited to Universal Serial Bus (USB) ports.

Computer 100 is able to communicate with a server 150 via a network 128 using a network interface 130, which is coupled to system bus 106. Network 128 may be an external network such as the Internet, or an internal network such as an Ethernet or a Virtual Private Network (VPN).

A hard drive interface 132 is also coupled to system bus 106. Hard drive interface 132 interfaces with a hard drive 134. In one embodiment, hard drive 134 populates a system memory 136, which is also coupled to system bus 106. System memory 136 is defined as a lowest level of volatile memory in computer 100. This volatile memory may include additional higher levels of volatile memory (not shown), including, but not limited to, cache memory, registers, and buffers. Code that populates system memory 136 includes an operating system (OS) 138 and application programs 144.

OS 138 includes a shell 140, for providing transparent user access to resources such as application programs 144. Generally, shell 140 (as it is called in UNIX®—UNIX is a registered trademark of The Open Group in the United States and other countries) is a program that provides an interpreter and an interface between the user and the operating system. Shell 140 provides a system prompt, interprets commands entered by keyboard 118, mouse 120, or other user input media, and sends the interpreted command(s) to the appropriate lower levels of the operating system (e.g., kernel 142) for processing. As depicted, OS 138 also includes kernel 142, which includes lower levels of functionality for OS 138. Kernel 142 provides essential services required by other parts of OS 138 and application programs 144. The services provided by kernel 142 include memory management, process and task management, disk management, and I/O device management.

Application programs 144 include a browser 146. Browser 146 includes program modules and instructions enabling a World Wide Web (WWW) client (i.e., computer 100) to send and receive network messages to the Internet. Computer 100 may utilize HyperText Transfer Protocol (HTTP) messaging to enable communication with server 150. Application programs 144 in system memory 136 also includes provisioning manager 148 that further includes web replay module 149. Graphical user interface (GUI) 200 enables a user to interface with provisioning manager 148 and web replay module 149. Provisioning manager 148 and web replay module 149 perform the functions described below in FIGS. 5-6.

The hardware elements depicted in computer 100 are not intended to be exhaustive, but rather represent and/or highlight certain components that may be utilized to practice the present invention. For instance, computer 100 may include alternate memory storage devices such as magnetic cassettes, Digital Versatile Disks (DVDs), Bernoulli cartridges, and the like. These and other variations are intended to be within the spirit and scope of the present invention.

Figure 2:
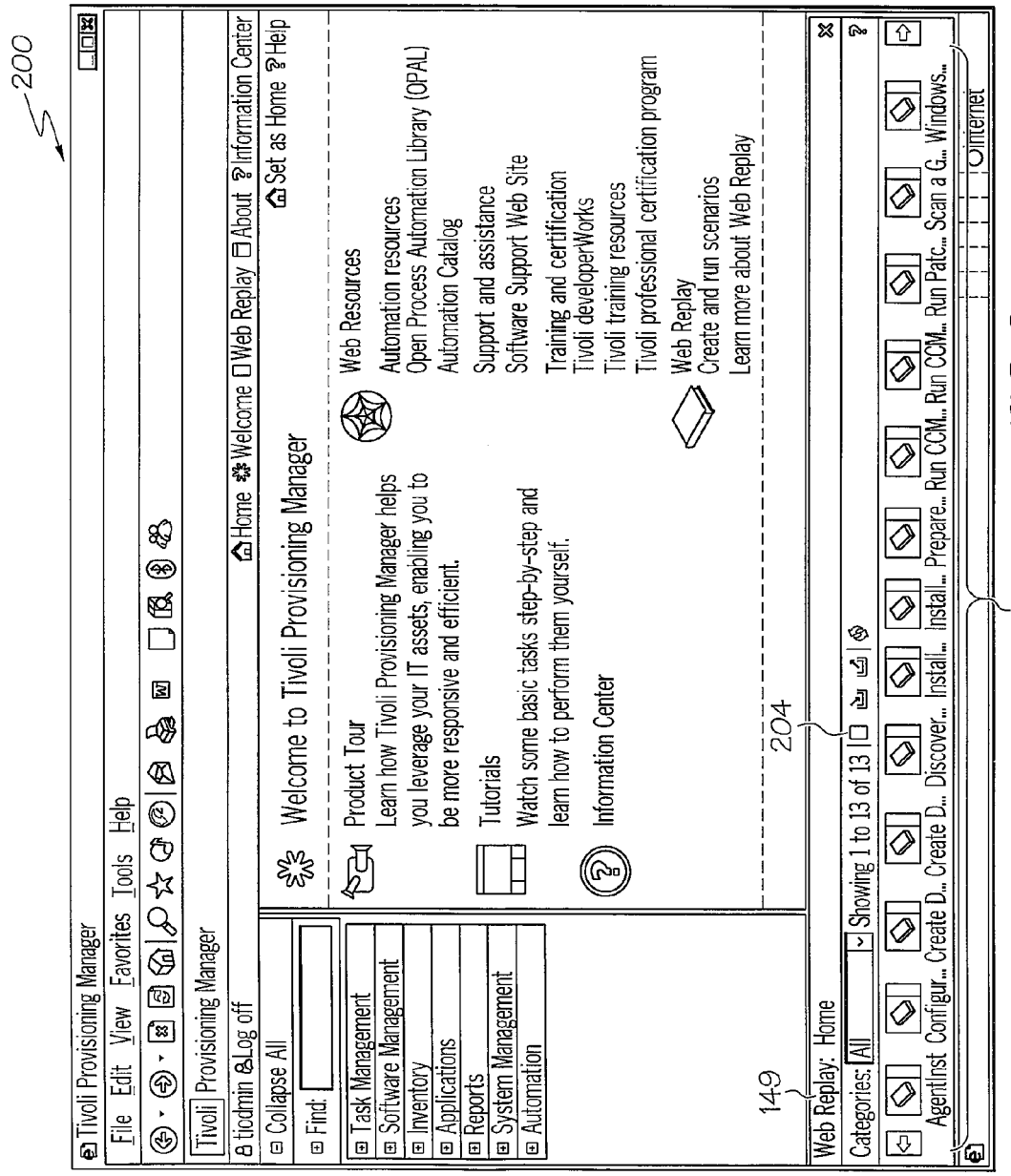
FIGS. 2-4 are pictorial depictions of a graphical user interface of a provisioning manager according to an embodiment of the present invention.

FIG. 2 is a pictorial representation of a graphical user interface (GUI) 200 (FIG. 1) of provisioning manager 148 (FIG. 1) according to an embodiment of the present invention. As illustrated, GUI 200 includes a user interface to a collection of provisioning manager 148 (FIG. 1) functions including a product tour, tutorials, information center, web resources (e.g., automation resources), and access to web-replay module 149 (FIG. 1). Also, the web replay module 149 (FIG. 1) includes a collection of previously recorded procedures 202 (FIG. 2) that enable automated web-based processes. It should be noted that provisioning manager is just one example of this approach being used by a product. This approach would be followed by any other product having a web-based interface, or by a browser plug-in that could do this across any web interface the user is accessing in the browser.

Figure 3:
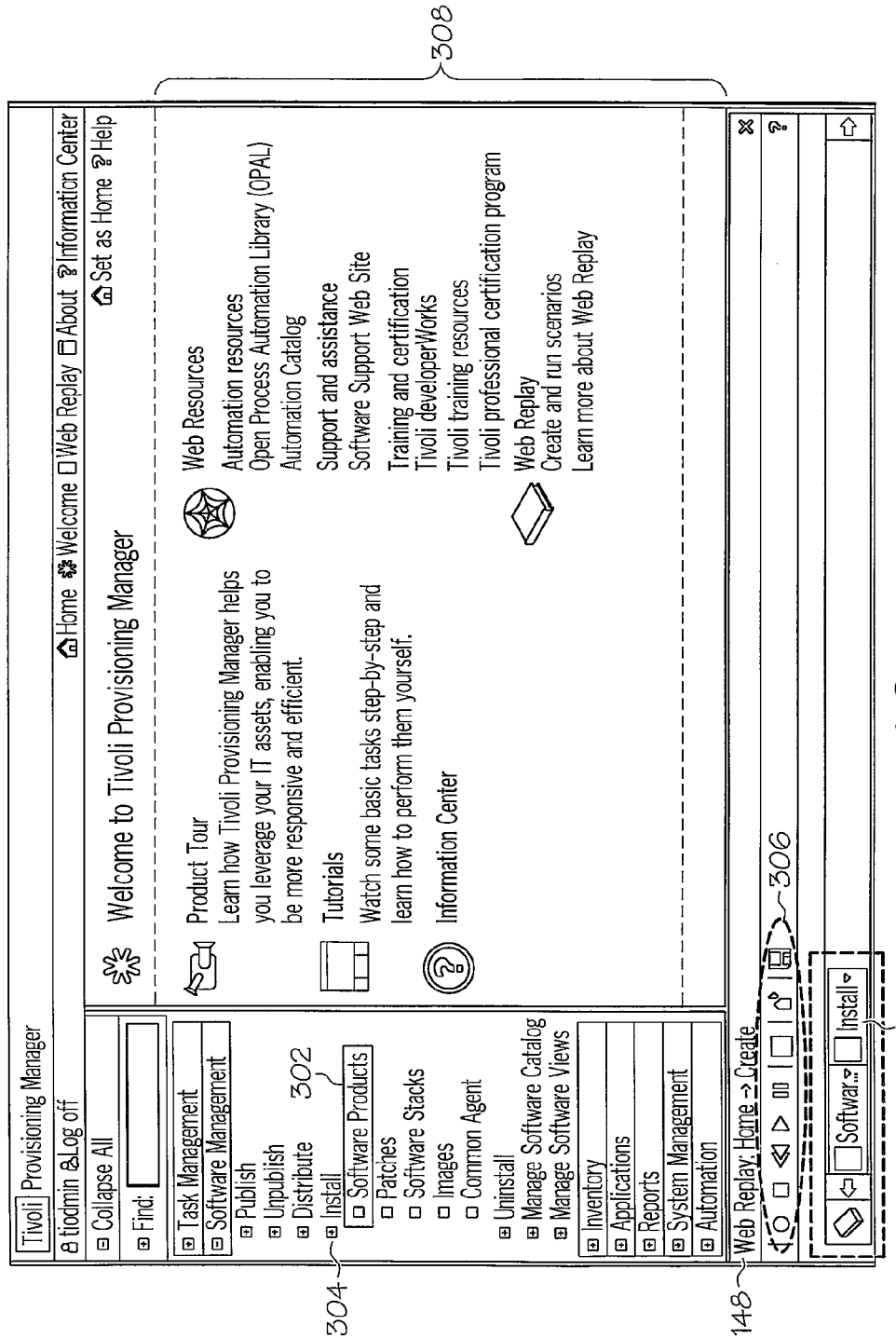

FIG. 3 is a pictorial representation of a GUI 200 (FIG. 1) of provisioning manager 148 (FIG. 1) and web replay 149 that has been put into a teaching mode according to an embodiment of the present invention. As depicted, selectable elements such as software products 302 (FIG. 3) are highlighted within GUI 200 (FIG. 1) as the user moves their mouse over the GUI informing the user what selectable elements web replay can record. When the user clicks on one of these highlighted boxes it is a signal to web replay module 149 to record that selectable element as a step in the procedure. The Install selectable element 304 was previously clicked upon in FIG. 3 which signaled web replay to add Install as the next step 310 within the procedure. Web replay module 149 (FIG. 1) includes control panel 306 (FIG. 3), which enables a user to control the teaching mode of web replay 149. The teaching mode of web replay module 198 (FIG. 1) is discussed herein in more detail in conjunction with FIG. 5, the ability to record and a sequence of selectable elements enables web replay module 149 to play them back to enable web-based automation.

Figure 4:
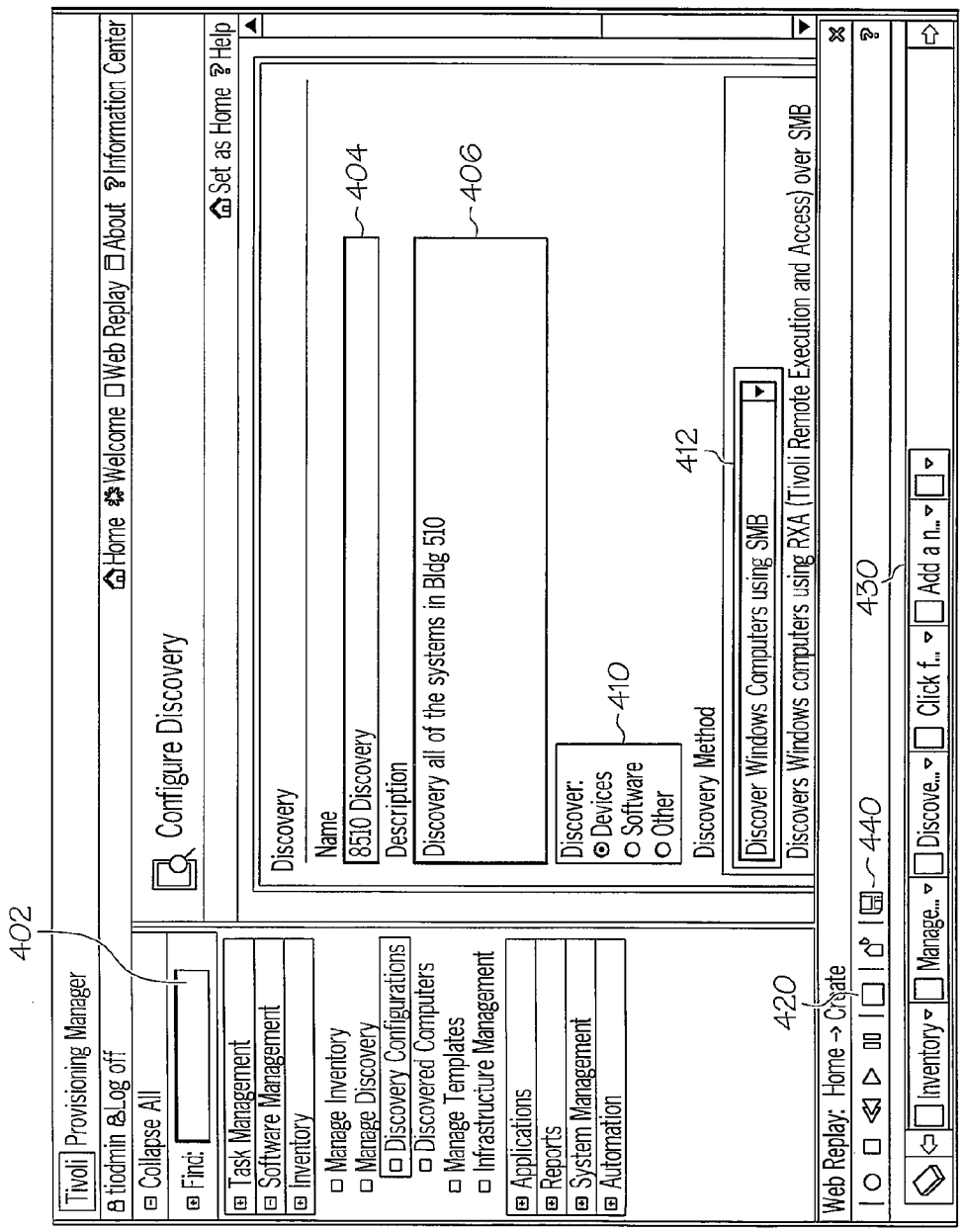

FIG. 4 is a pictorial representation of GUI 200 (FIG. 1) of provisioning manager 148 (FIG. 1) and web replay 149 in an input capture mode according to an embodiment of the present invention. As illustrated, when the user selects capture data 420 (FIG. 4) in the web replay control panel 306 all input data provided by the user in the provisioning manager GUI 148 will be captured as the next step in the procedure. Text input fields 402, 404, and 406 are recorded, as are radio buttons 410 and a drop down list at 412. All input fields are recorded in this manner, with a new data specification added to the procedure shown at 430. As discussed herein in more detail in conjunction with FIG. 5, input capture mode enables provisioning manager 148 (FIG. 1) to capture and playback data within input fields to enable web-based automation.

Figure 5:
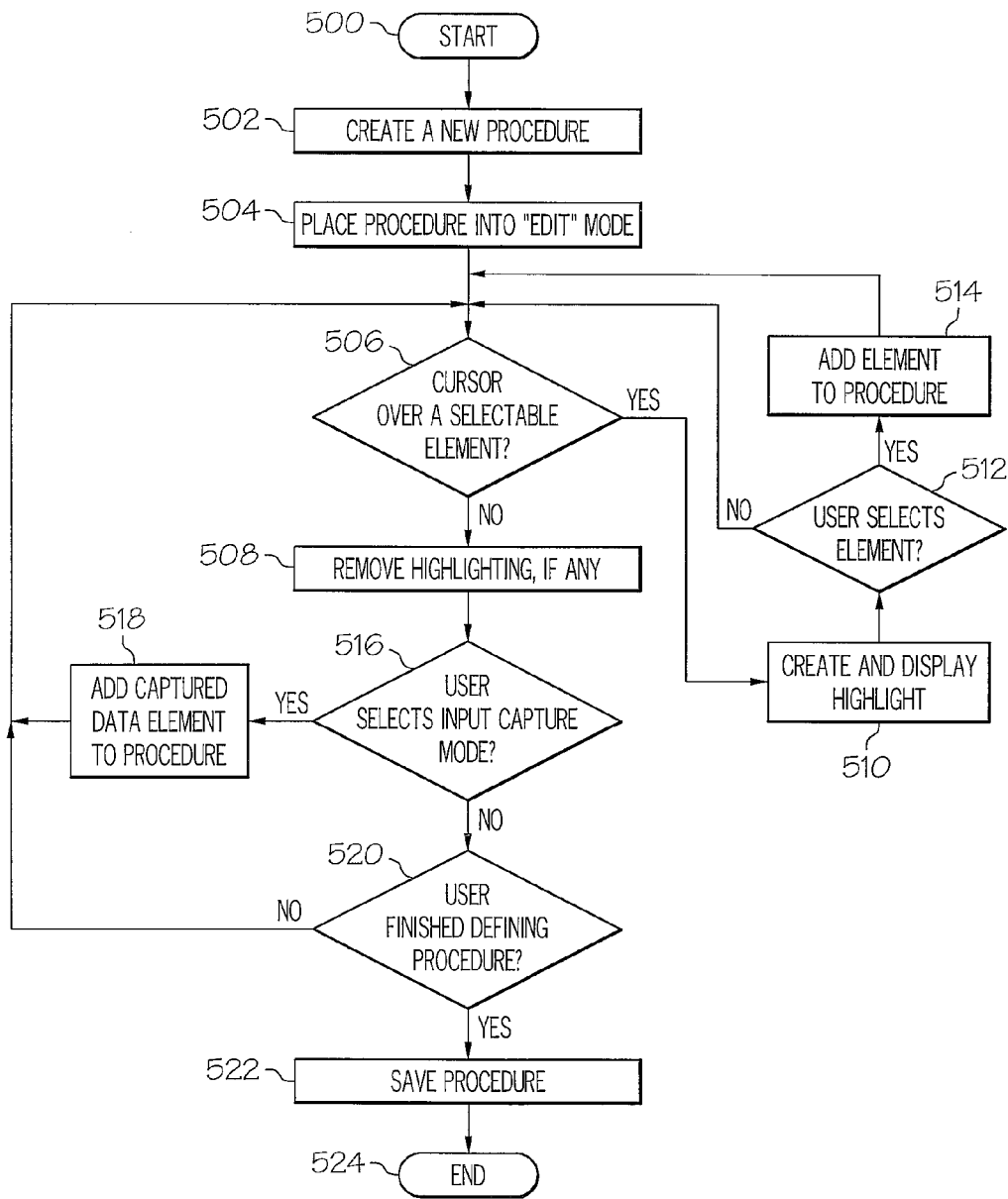
FIG. 5 is a high-level logical flowchart illustrating an exemplary method for implementing a teaching mode for web replay according to an embodiment of the present invention.

FIG. 5 is a high-level logical flowchart illustrating an exemplary method for implementing a teaching mode for web replay according to an embodiment of the present invention. The process begins at step 500 and continues to step 502, which illustrates provisioning manager 148 (FIG. 1) receiving a command to create a new procedure. As shown in FIG. 2, a user indicates to provisioning manager 148 (FIG. 1) that a new procedure is to be created by selecting the "new procedure" icon 204 (FIG. 2) in web replay 149, which enables web replay module 149 (FIG. 1) to display its control panel 306 (FIG. 3) and starts recording the procedure. The process continues to step 504, which shows web replay 149 (FIG. 1) receiving a command to place the newly-created procedure into "edit" mode. Edit mode enables web replay 149 (FIG. 1) to enter into a teaching mode that allows adding selectable elements or data elements to the procedure.

The process continues to step 506, which illustrates provisioning manager 148 (FIG. 1) determining if a cursor is placed over a selectable element. According to an embodiment of the present invention, a "selectable element" is an area in GUI 200 (FIG. 1) where some action is invoked when selecting that area in GUI 200 (FIG. 1). Example selectable elements are buttons, links, and any browser element having an "onclick" event defined to that element. If provisioning manager 148 (FIG. 1) determines that the cursor is placed over a selectable element, the process continues to step 510, which illustrates provisioning manager 148 (FIG. 1) creating and displaying a highlight around the selectable element. According to an embodiment of the present invention, the highlight may be a red box around the selectable element, such as the outline shown around software products 302 (FIG. 3) in FIG. 3.

The process continues to step 512, which shows web replay 149 (FIG. 1) determining if the user has selected the selectable element. If not, the process returns to step 506. If the user has selected the selectable element, the process continues to step 514, which illustrates web replay 149 (FIG. 1) adding the element to the procedure. Also, according to an embodiment of the present invention, the user may also designate the selectable element as a manual or automatic action. Web replay 149 will also select the element in the provisioning manager 148 GUI, as if the user clicked upon the element themselves. The process returns to step 506.

Returning to step 506, if provisioning manager 148 (FIG. 1) determines that the cursor is not placed over a selectable element, the process continues to step 508, which illustrates provisioning manager 148 (FIG. 1) removing any highlighting in GUI 200, if any. The process continues to step 516, which shows the provisioning manager 148 (FIG. 1) determining if a user has selected an input capture mode from control panel 306 (FIG. 3). Referring back to FIG. 4 input fields 402, 404, 406, 410 and 412 (FIG. 4) include data elements that are used as input in a form. Web replay 149 (FIG. 1) determines if the user has selected the input capture mode based upon the user selecting the data capture button 420. If so the process continues to step 518, which illustrates web replay 149 (FIG. 1) capturing data in input fields 402, 404, and 406 (FIG. 4) and adding the captured data elements in the procedure. The process returns to step 506.

If web replay 149 (FIG. 1) determines that the user has not selected an input capture mode, the process continues to step 520, which illustrates web replay 149 (FIG. 1) determining if the user has completed defining the procedure. According to an embodiment of the present invention, the user may access control panel 306 (FIG. 3) and select the save button 440 (FIG. 4) to indicate the end of a procedure definition. If the user has not completed the procedure definition, the process returns to step 506. If so, the process continues to step 522, which illustrates web replay 149 (FIG. 1) saving the defined procedure. The process ends, as shown in step 524.

Figure 6:
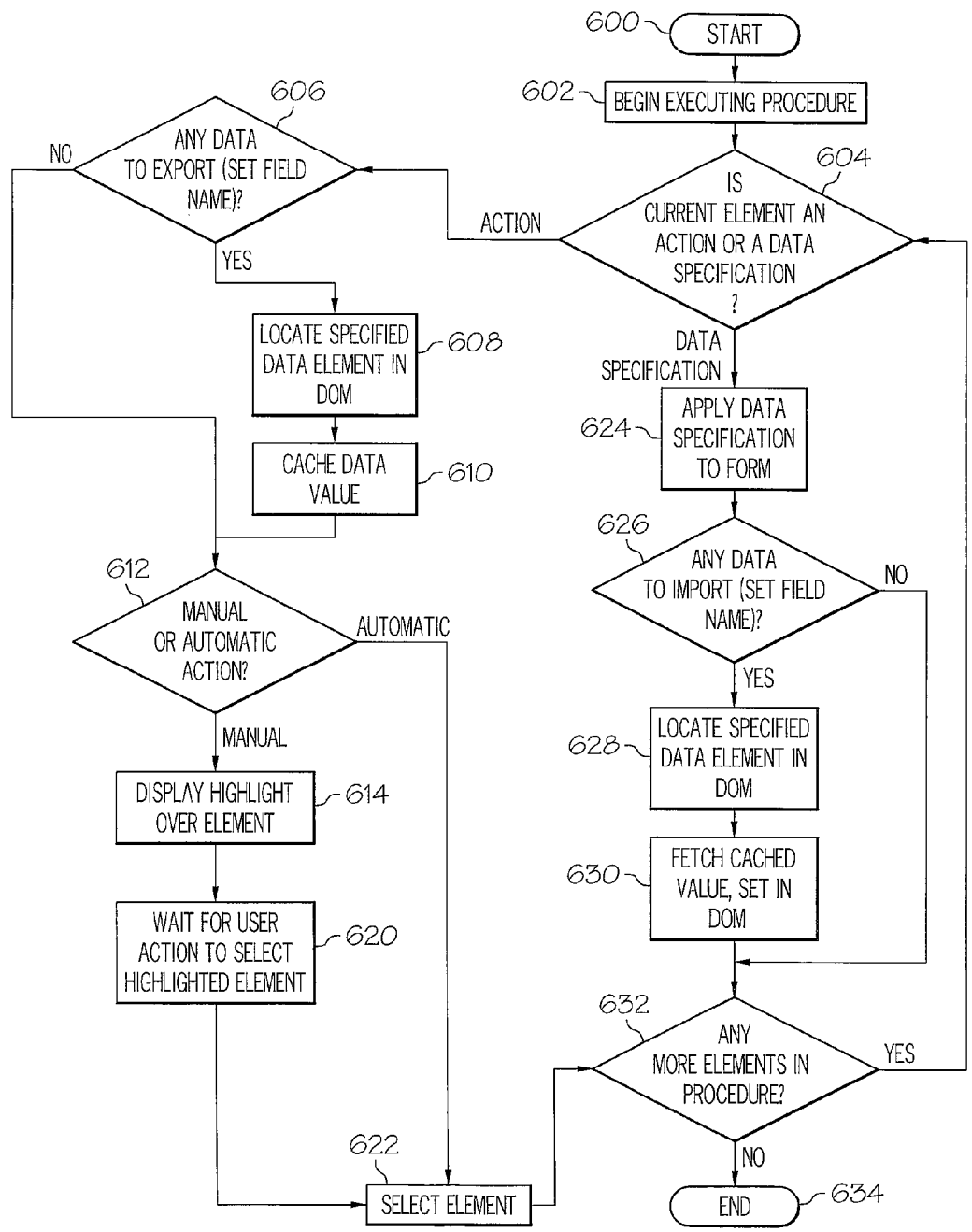
FIG. 6 is a high-level logical flowchart depicting an exemplary method for replay of a procedure defined in the teaching mode according to an embodiment of the present invention.

FIG. 6 is a high level logical flowchart depicting the replay of a procedure according to an embodiment of the present invention. The process begins at step 600 and proceeds to step 602, which illustrates web replay 149 (FIG. 1) executing a procedure defined by the teaching mode discussed in conjunction with FIG. 5. The process continues to step 604, which illustrates web replay 149 (FIG. 1) determining if the current element in the procedure is an action or a data specification. According to an embodiment of the present invention, an "action" is defined as a selection of a selectable element. A "data specification" is a form that must be filled with information that was captured during an input capture mode as discussed in conjunction with FIG. 5.

If the current element is an action, the process continues to step 606, which illustrates web replay 149 (FIG. 1) determining if there is any data to export. If there is data to export, the process continues to step 608, which depicts web replay 149 (FIG. 1) locating specified data in the document object model (DOM). The process continues to step 610, which illustrates web replay 149 (FIG. 1) caching located data value. The process then continues to step 612.

If there is no data to export, the process continues to step 312, which illustrates web replay 149 (FIG. 1) determining if the action is a manual (needs a user to actually make the selection) or an automatic (selection made without user intervention) action. If the action is a manual action, the process continues to step 614, which illustrates web replay 149 (FIG. 1) displaying a highlight over the selectable element. The process continues to step 620, which illustrates web replay 149 (FIG. 1) waiting for an user action to select the highlighted element. The process then continues to step 622, which illustrates web replay 149 selecting the element. Returning to step 612, if the action is an automatic action, the process proceeds to step 622. From step 622, the process continues to step 632.

Returning to step 604, if the current element is a data specification (e.g., a form that includes queries that require input data, etc.), the process continues to step 624, which illustrates web replay 149 (FIG. 1) applying information captured during an input capture mode as discussed in conjunction with FIG. 5. The process continues to step 626, which illustrates web replay 149 (FIG. 1) determining if there is any data to import into the data specification. If not, the process continues to step 632. If so, the process continues to step 628, which depicts web replay 149 (FIG. 1) locating the specified data element in the document object model (DOM). The process proceeds to step 630, which illustrates web replay 149 (FIG. 1) fetching the cached value set in the document object model.

The process continues to step 632, which illustrates web replay 149 (FIG. 1) determining if there are any more elements in the procedure. If not, the process ends, as shown in step 634. If so, the process returns to step 604.

Figure 7:
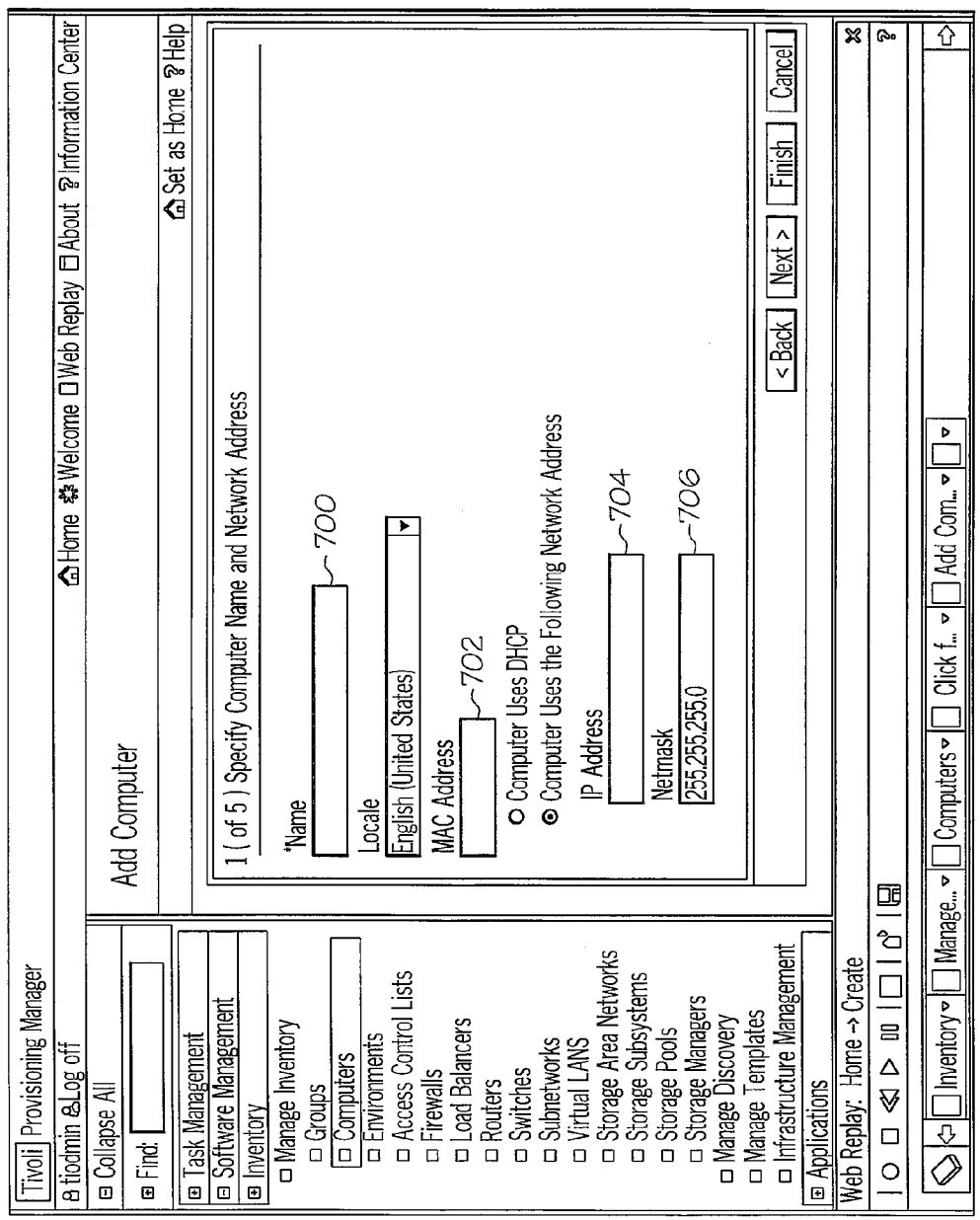
Figure 8:
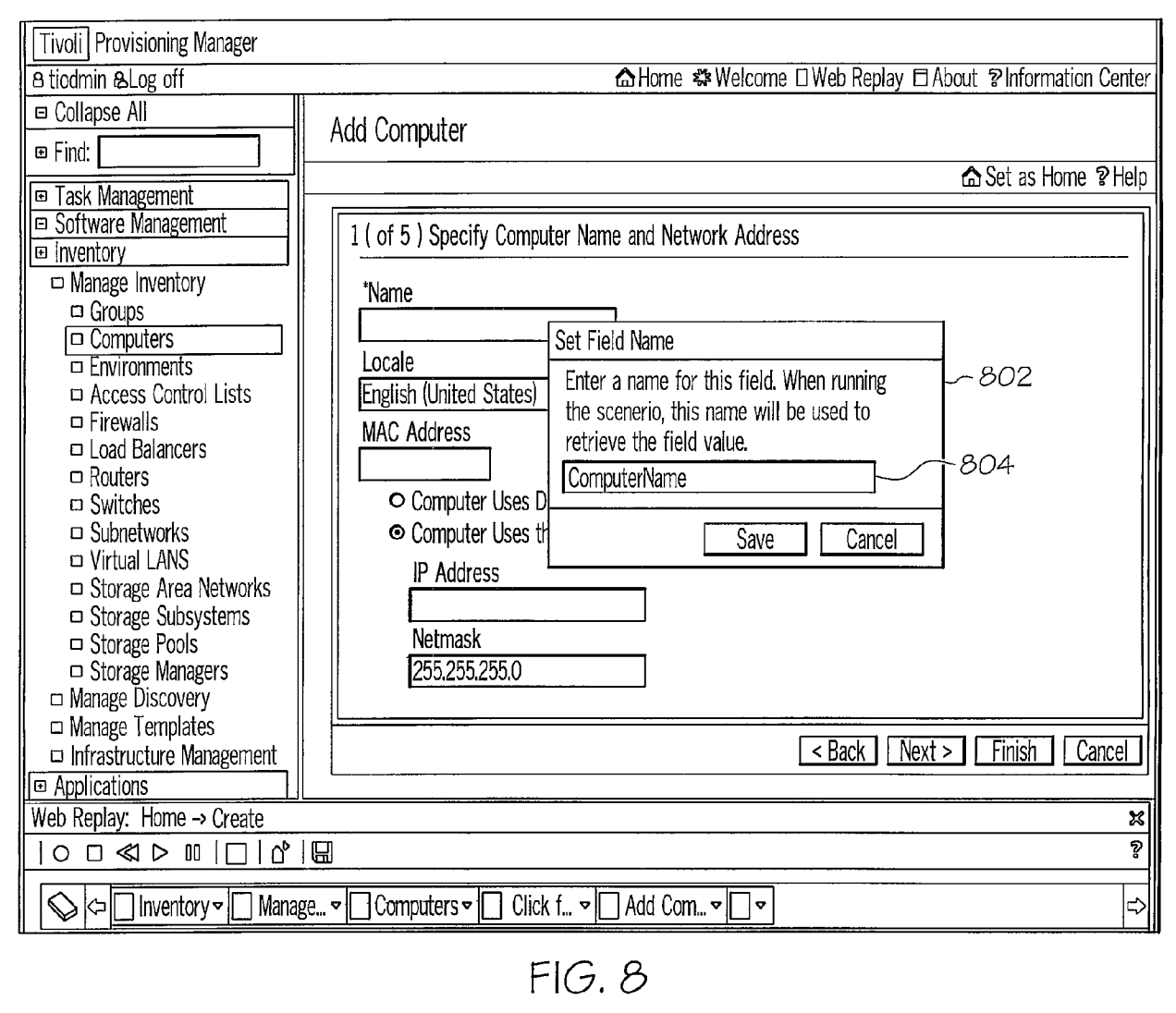
Figure 9:
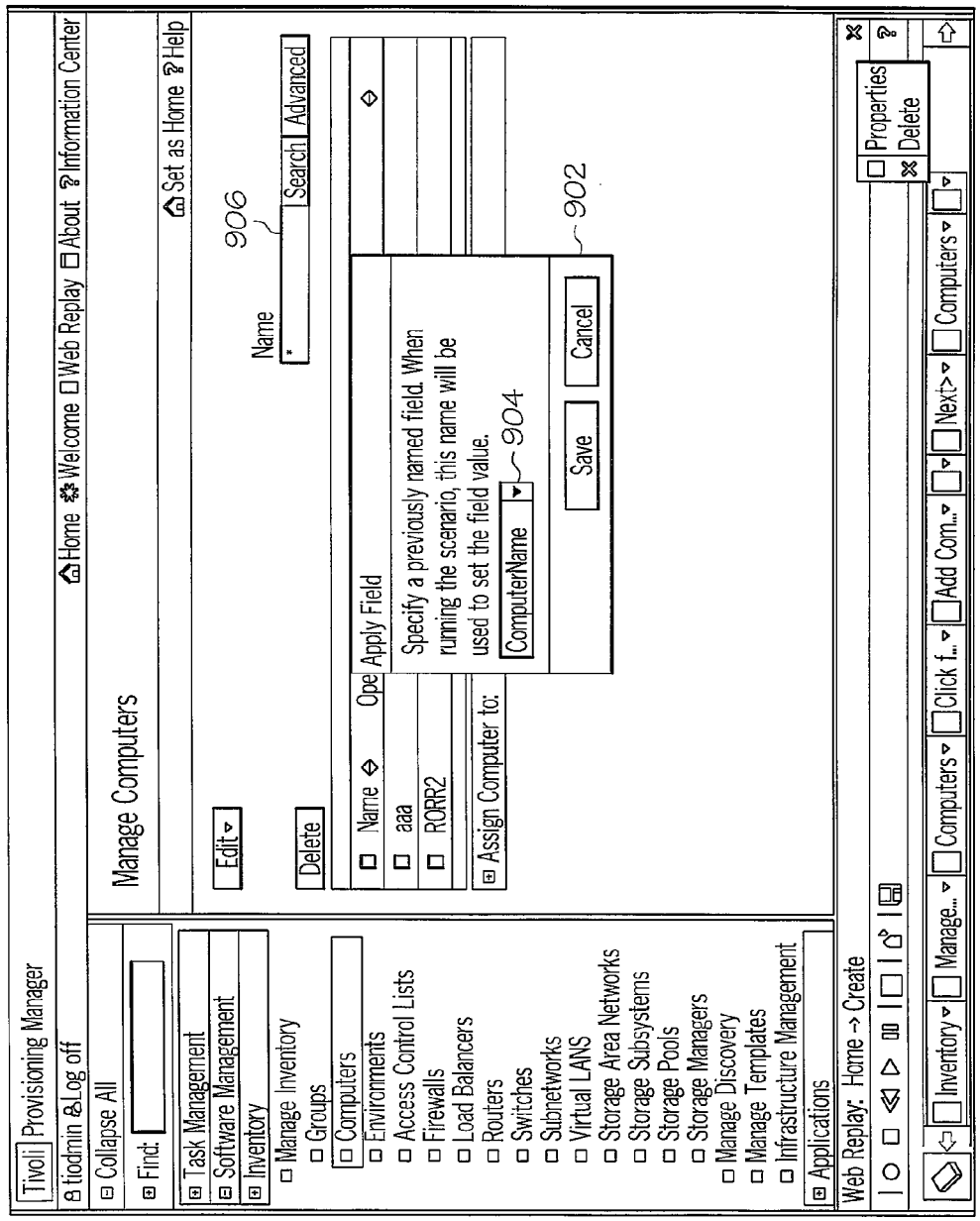

FIGS. 7-9 are pictorial representations of a pictorial representation of GUI 200 (FIG. 1) of provisioning manager 148 (FIG. 1) and web replay 149 providing for data reuse according to an embodiment of the present invention. Referring to FIG. 7, fields 700, 702, 704, and 706 are potential fields for data reuse that are highlighted. FIG. 8 illustrates a user selecting the "name" field, which brings up "set field name" dialog box 802 and field value 804. The user may give a name to a specific data element. The name may be unique, but otherwise can be set to any name that enables the user to remember the name of the data element. When running a procedure, a data attribute having a name is a marker to web replay 149 that the value of this particular field is important and should be made available for reuse at some later point. When the identification of an important field is detected, the value on the data element when the next manual or automatic task is run is fetched and internally cached for later use, as described in steps 606, 608, and 610 of FIG. 6.

FIG. 9 illustrates "apply field" dialog box 902 that enables a user to apply any previously-marked field into a current data element 906. Pull-down menu 904 enables the user to select between any previously-marked fields. When running a procedure the "ComputerName" value (shown in pull-down menu 904) will be collected and cached on the step that defined that field name. Then, during procedure processing, when a step in the procedure encounters this particular data specification, web replay 149 will apply the cache value for "ComputerName" into the specified field.

The highlights described in the specification may be implemented by dynamically manipulating the GUI 200. An hypertext markup language (HTML) division (DIV) tag is created for each data element in GUI 200 and added to the document object model (DOM) of provisioning manager 148, which defines a size and location equal to the entry field. According to an embodiment of the invention, a transparent image file (e.g., JPEG, GIF, PNG, etc.) may be utilized as the main body, so that when a user clicks on the data element, the user has the illusion of clicking on the data element but in reality, the user is selecting the highlight. The context menus and dialogs are also implemented in a similar manner in that they are dynamically generated and added to the DOM.

When caching data, the data is cached upon the next action in the procedure and not when processing the data specification. According to an embodiment of the present invention, the data specification will be followed by a manual task (though that is not required), and when the user clicks on the highlighted action, the data will be collected and cached. Of course, those with skill in the art will appreciate that the present invention is not limited to capturing data from text area entry fields but includes the capture and data sharing of any type of data.

For each data element saved within the data specification: if it is to be exported, save the exported name. If it is to be imported, save the imported name. A previous data specification must have provided the exported name. Also, according to an embodiment of the present invention, the data specification may be marked to convey if the particular information should be imported or exported.

When a user wishes to add an action (e.g., a selection of a selectable element) or a data specification to a procedure, web replay 149 will capture information about the added action or data specification. Depending how any given panel in the GUI is presented, there may be varying degrees of information to reply upon, so web replay 149 gathers as much information as possible. Web replay 149 employs multiple schemes to attempt to locate a particular selectable element or data specification during the future replay of a procedure.

During the future replay of a procedure, each selectable element or data specification within the procedure must be located within the GUI to be processed. To locate a selectable element, web replay 149:

(1) Attempts to locate the selectable element by ID. If an ID is present, the ID should be unique within the GUI to easily locate the selectable element.

(2) Locates the owning frame of the selectable element. If there is no owning frame, utilize a time within the GUI to try again in a short amount of time (e.g., 200 ms). Prior steps in the procedure could be driving actions that take time to process, which delays the appearance of an owning frame. Reducing the scope of the search for the selectable element to a known owning frame reduces the occurrence of bad hits.

(3) Locates all auxiliary frames and forms. When the procedure was created, the particular selectable element was on a page that generally has a small set of frames, iframes, and/or forms. Presence of these same entities on playback helps insure that provisioning manager 148 has reached the same state before web replay 149 allows the procedure to continue.

(4) Gets a list of all selectable elements of the same type within the frame's document.

(5) Loops through the selectable elements until web replay 149 finds a solid match:

(a) Does the selectable element have the same name or display name? Does the selectable element's hierarchy and positional hierarchy match?

(b) Does the selectable element's inner text match? Does the selectable element's hierarchy and positional hierarchy math?

(c) Is the selectable element an OPTION HTML type and does its value match?

(d) If there is no match yet, do any of the preceding three items match when considering a shorter positional hierarchy or plain shorter hierarchy? If so, remember as "best match" so far (positional hierarchy has precedence). The "short" hierarchy is used mainly to account for updates in provisioning manager 148 GUI across releases, where selectable elements are merely moved around the page. If an update is released, the short hierarchy should locate the selectable element whereas the full hierarchy may not.

(6) Utilizing the "best match", if available, if there is no solid match. According to an embodiment of the present invention, a customization setting may be available to control how close of a match must be found before being utilized.

(7) Setting a timer and trying again in a predetermined amount of time (e.g., 200 ms). However. If a predetermined longer period of time has elapsed, sending a notification to a user or system administrator to report the failure of a particular step in the procedure replay.

When processing a data specification, web replay 149:

(1) Loops through all identified forms (a) Locates the owning frame of the form. If the owning frame does not exist, utilizing a timer within the GUI to try again in a short amount of time (e.g., 200 ms). Previous steps in the procedure could be driving actions that take several seconds to process, before the owning frame appears in the GUI.

(b) Locates all auxiliary frames and forms. When the procedure was created, the form was on a page that generally has a small set of frames, iframes, and/or forms. Presence information of these same entities on playback of the procedure helps insure that provisioning manager 148 has reached the same state before allowing playback to continue.

(c) Locates the form within the owning frame. First utilize the form's ID if present, then utilize its name in conjunction with the hierarchy and positional hierarchy as previously described. If the form cannot be found, utilize a timer to try again in a predetermined amount of time (e.g., 200 ms).

(d) Loops through all attributes saved in the procedure for this form:
(i) Locates the corresponding element with the GUT
(ii) Attempts to locate the corresponding element by ID.
(iii) Does the GUT element have the same name or display name? Does the GUT element's hierarchy and positional hierarchy match as previously described?
(iv) If no match is found yet, does the preceding item match when considering a shorter positional hierarchy or plain shorter hierarchy? If so, this match is considered a "best match".

(3) If there is still no match, a timer is utilized to try the entire process again in a predetermined period of time (e.g., 200 ms). However, if a longer period of time has elapsed, web replay 149 reports an error to a user or system administrator.

The following information is retained for a selectable element:
(1) Owning frame: The owning frame that includes the selectable element. The "owning frame" identity includes several components:
(i) ID: The ID corresponds to the "id" attribute on the document object model (DOM) element if it is present. This is the best data to rely upon as this ID is unique within a GUI.
(ii) Name: The name corresponds to the "name" attribute on the DOM element if it is present
(iii) Hierarchy: The hierarchy is the concatenation of the nodeName attribute (DOM element type) of all ancestors.
(iv) Positional Hierarchy: The positional hierarchy is the concatenation of the nodeName attribute (DOM attribute type) of all ancestors, along with index of each ancestor within its parents list of children.
(2) Auxiliary Frames: Auxiliary frames identify other frames present within the GUI.
(3) Auxiliary Forms: Auxiliary Forms identify the forms present in the GUI.
(4) Name
(5) Type: The type of element captured in the procedure.
(6) Subtype: The further definition of an element (e.g., radio buttons, check boxes, text entry fields, etc.)
(7) Display name: Display name corresponds to any type of textual label for an element.
(8) Inner text: Inner text is text data that corresponds to a particular element and any related child elements.
(9) Hierarchy: Hierarchy is a concatenation of the nodeName attribute (DOM element type) of all ancestors
(10) Positional Hierarchy: Positional Hierarchy is a concatenation of the nodeName attribute of all ancestors, along with an index of each ancestor within its parent's list of children.
(11) Short Hierarchy: The Short Hierarchy is a concatenation of the nodeName attribute of all ancestors, up until the first ancestor that is typically utilized for layout.
(12) Short Positional Hierarchy: The Short Positional Hierarchy is similar to the Short Hierarchy, but also includes the index of each ancestor within its parent's list of children.

The following information is retained for a data specification:
(1) Owning frame: The owning frame that includes the form. The "owning frame" identity includes several components:
(i) ID: The ID corresponds to the "id" attribute on the document object model (DOM) element if it is present. This is the best data to rely upon as this ID is unique within a GUI.
(ii) Name: The name corresponds to the "name" attribute on the DOM element if it is present
(iii) Hierarchy
(iv) Positional Hierarchy:
(2) Auxiliary Frames: Auxiliary frames identify other frames present within the GUI.
(3) Auxiliary Forms: Auxiliary Forms identify the forms present in the GUI.
(i) Name
(ii) Type: The type of element captured in the procedure.
(iii) Hierarchy: Hierarchy is a concatenation of the nodeName attribute (DOM element type) of all ancestors
(iv) Positional Hierarchy: Positional Hierarchy is a concatenation of the nodeName attribute of all ancestors, along with an index of each ancestor within its parent's list of children.
(v) Short Hierarchy: The Short Hierarchy is a concatenation of the nodeName attribute of all ancestors, up until the first ancestor that is typically utilized for layout.
(vi) Short Positional Hierarchy: The Short Positional Hierarchy is similar to the Short Hierarchy, but also includes the index of each ancestor within its parent's list of children.
(vii) Value: Value represents the element's value captured while creating the procedure.

Figure 10:
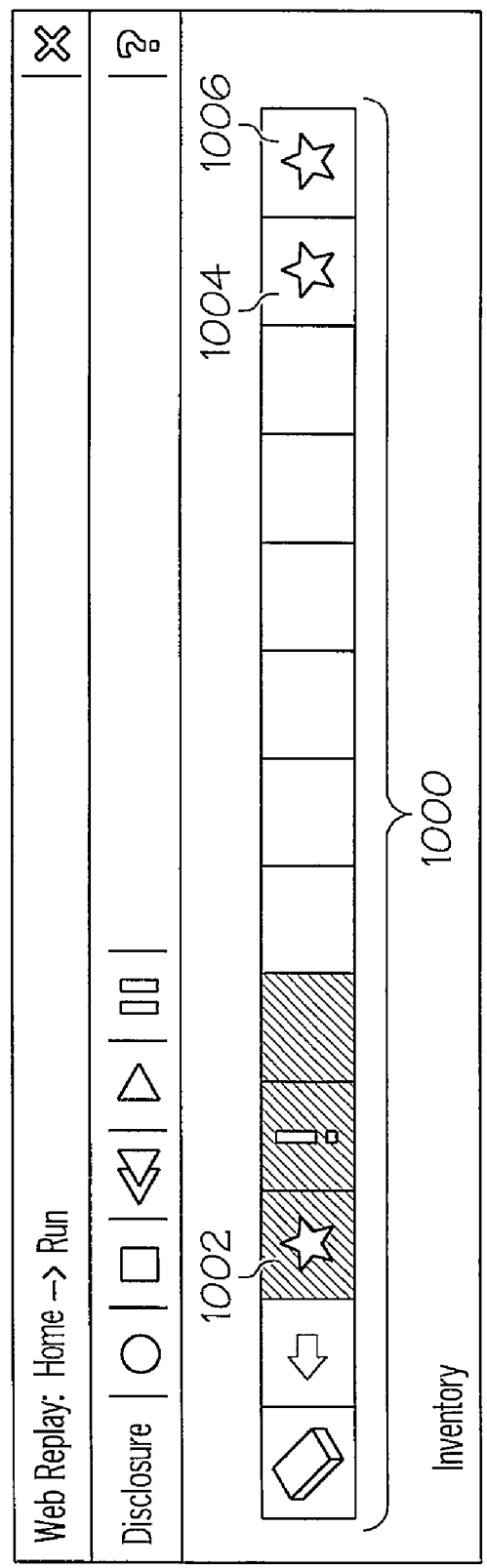
FIG. 10 is a pictorial depiction of a graphical user interface of a provisioning manager that enables visualization of a mixture of automated and manual steps in a procedure according to an embodiment of the present invention.

FIG. 10 is a pictorial representation of a graphical user interface 200 of a provisioning manager 148 that enables visualization of a mixture of automated and manual steps in a procedure according to an embodiment of the present invention. As illustrated, status bar 1000 enables the user to judge the time between manual steps in the procedure (that require user input—steps 1002, 1004, and 1006) and automatic steps in the procedure (that do not require any action on the part of the user—all other steps in the procedure). As depicted in FIG. 10, the user knows that after the first step, there is no input required from the user until the end of the procedure processing. According to an embodiment of the present invention, web replay 149 can also track the average amount of time to run each of the steps in the procedure, so that a display of the estimate of the amount of time remaining until the next manual step is active to present work for the user to perform.

According to FIG. 10, the manual steps in the procedure are highlighted with a "star". Of course, those with skill in the art will appreciate that any type of highlighting can be utilized in the present invention. Also, an embodiment of the present invention will display a status bar 1000 of the steps in the procedure and indicate which one of the steps is currently being processed and which steps in the procedure have already been performed. If a prior step in the procedure has failed, a failure can be illustrated with a "!" mark or any other type of warning indicia.

Note that the flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function (s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

Having thus described the invention of the present application in detail and by reference to embodiments thereof, it will be apparent that modifications and variations are possible without departing from the scope of the invention defined in the appended claims.

What is claimed is:

1. A computer-implementable method for providing run book automation on a data processing system, said computer-implementable method comprising: receiving a command to create a new procedure for interacting with a web-based graphical user interface (GUI); engaging a teaching mode in the web-based GUI in response to the command to create the new procedure, wherein a plurality of selectable portions of said web-based GUI are accentuated; recording a sequence of selections made among said plurality of selectable portions of said web-based GUI and capturing at least one data attribute in an input field, wherein said at least one data attribute provides at least one response to data queries within said web-based GUI, and further wherein said sequence of selections and said capturing at least one data attribute is included in the new procedure for interacting with said web-based GUI; and enabling said new procedure for interacting with said web-based GUI, including replaying said sequence of selections within said web-based GUI and applying said captured at least one data attribute as input, wherein the replaying includes displaying a status of said replaying of said sequence of selections that enables a user to differentiate between manual steps that require user intervention and automatic steps that do not require user intervention, and determining if a current element in the replaying of said sequence of selections is one of an selection of a selectable element and a form to be filled with data, wherein if the current element is a selection of a selectable element, further determining~if there is any data to export, and wherein if the current element is a form to be filled with data, further determining~if there is any data to import.

2. The computer-implementable method according to claim 1, wherein said capturing at least one data attribute in an input field is enabled upon initiation of an input capture mode within said web-based GUI.

3. The computer-implementable method according to claim 1, wherein said recording further comprises: capturing a collection of metadata identifying each selection among said sequence of selections within said GUI to enable location of each said selection during said replay.

4. The computer-implementable method according to claim 3, wherein said replaying further comprises: utilizing said collection of metadata to locate each selection among said sequence of selection within said GUI.

5. The computer-implementable method according to claim 4, wherein said collection of metadata further comprises an owning frame, at least one auxiliary frame, at least one auxiliary form, an identification, a name, a type, a subtype, a display name, a collection of inner text, a hierarchy attribute, a positional hierarchy attribute, a short hierarchy attribute, and a short positional hierarchy attribute.

6. The computer-implementable method of claim 1, wherein displaying the status of the replaying of the sequence of selections includes displaying a status bar that reflects an amount of time between the manual steps and the automatic steps.

7. The computer-implementable method of claim 1, wherein displaying the status of the replaying of the sequence of selections includes displaying a status bar that reflects which of the manual steps and the automatic steps have already been performed.

8. A system for providing run book automation on a data processing system, said system comprising: a processor; a data bus coupled to said processor; a memory coupled to said data bus; and a computer-usable medium embodying computer program code, said computer program code comprising instructions executable by said processor and configured for providing run book automation on a data processing system by performing the steps of: receiving a command to create a new procedure for interacting with a web-based graphical user interface (GUI); engaging a teaching mode in the web-based GUI in response to the command to create the new procedure, wherein a plurality of selectable portions of said web-based GUI are accentuated; recording a sequence of selections made among said plurality of selectable portions of said web-based GUI and capturing at least one data attribute in an input field, wherein said at least one data attribute provides at least one response to data queries within said web-based GUI, and further wherein said sequence of selections and capturing at least one data attribute is included in the new procedure for interacting with said web-based GUI; and enabling said new procedure for interacting with said web-based GUI, including replaying said sequence of selections within said web-based GUI and applying said captured at least one data attribute as input, wherein the replaying includes displaying a status of said replaying of said sequence of selections that enables a user to differentiate between manual steps that require user intervention and automatic steps that do not require user intervention, and determining if a current element in the replaying of said sequence of selections is one of an selection of a selectable element and a form to be filled with data, wherein if the current element is a selection of a selectable element, further determining if there is any data to export, and wherein if the current element is a form to be filled with data, further determining if there is any data to import.

9. The system according to claim 8, wherein said instructions for capturing at least one data attribute in an input field are further configured to initiate upon initiation of an input capture mode within said web-based GUI.

10. The system according to claim 8, wherein said instructions for recording are further configured for: capturing a collection of metadata identifying each selection among said sequence of selections within said GUI to enable location of each said selection during said replay.

11. The system according to claim 10, wherein said instructions for replaying are further configured for: utilizing said collection of metadata to locate each selection among said sequence of selection within said GUI.

12. The system according to claim 11, wherein said collection of metadata further comprises an owning frame, at least one auxiliary frame, at least one auxiliary form, an identification, a name, a type, a subtype, a display name, a collection of inner text, a hierarchy attribute, a positional hierarchy attribute, a short hierarchy attribute, and a short positional hierarchy attribute.

13. A computer program product for providing run book automation on a data processing system, said computer program product comprising: a non-transitory computer usable storage medium having computer usable program code embodied therewith, said computer usable program code comprising: computer usable program code configured to receive a command to create a new procedure for interacting with a web-based graphical user interface (GUI); computer usable program code configured to engage a teaching mode the web-based GUI in response to the command to create the new procedure, wherein a plurality of selectable portions of said web-based GUI are accentuated; computer usable program code configured to record a sequence of selections made among said plurality of selectable portions of said web-based GUI and capture at least one data attribute in an input field, wherein said at least one data attribute provides at least one response to data queries within said web-based GUI, and further wherein said sequence of selections represents the new procedure for interacting with said web-based GUI; and computer usable program code configured to enable said new procedure for interacting with said web-based GUI, including replay said sequence of selections within said web-based GUI and apply said captured at least one data attribute as input, wherein the replaying includes displaying a status of said replaying of said sequence of selections that enables a user to differentiate between manual steps that require user intervention and automatic steps that do not require user intervention, and determining if a current element in the replaying of said sequence of selections is one of an selection of a selectable element and a form to be filled with data, wherein if the current element is a selection of a selectable element, further determining if there is any data to export, and wherein if the current element is a form to be filled with data, further determining if there is any data to import.

14. The computer program product according to claim 13, wherein said computer usable code configured to capture at least one data attribute is enabled upon initiation of an input capture mode within said web-based GUI.

15. The computer program product according to claim 13, wherein said computer usable code for recording is further configured to: capture a collection of metadata identifying each selection among said sequence of selections within said GUI to enable location of each said selection during said replay.

16. The computer program product according to claim 15, wherein said computer usable code for replaying is further configured to: utilize said collection of metadata to locate each selection among said sequence of selection within said GUI.

17. The computer program product according to claim 15, wherein said collection of metadata further comprises an owning frame, at least one auxiliary frame, at least one auxiliary form, an identification, a name, a type, a subtype, a display name, a collection of inner text, a hierarchy attribute, a positional hierarchy attribute, a short hierarchy attribute, and a short positional hierarchy attribute.

18. The computer program product of claim 15, wherein the computer usable medium is a component of a remote server, and wherein the computer usable program code is deployable to a local computer from the remote server.

19. The computer program product of claim 15, wherein the computer usable program code is capable of being provided by a service provider to a customer on an on-demand basis.

* * * * *